United States Patent
Larsson et al.

(10) Patent No.: US 9,913,284 B2
(45) Date of Patent: Mar. 6, 2018

(54) CONTROLLING SCHEDULING REQUESTS

(71) Applicant: TELEFONAKTIEBOLAGET L M ERICSSON (PUBL), Stockholm (SE)

(72) Inventors: Tony Larsson, Upplands Väsby (SE); Mona Matti, Nacka (SE); Rickard Cöster, Hägersten (SE); Vincent Huang, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 339 days.

(21) Appl. No.: 14/674,365

(22) Filed: Mar. 31, 2015

(65) Prior Publication Data

US 2015/0289287 A1    Oct. 8, 2015

(30) Foreign Application Priority Data

Apr. 2, 2014    (EP) .................................... 14163208

(51) Int. Cl.
*H04L 12/26*    (2006.01)
*H04W 72/12*    (2009.01)
*H04L 12/801*    (2013.01)
*H04W 72/04*    (2009.01)

(52) U.S. Cl.
CPC ....... *H04W 72/1252* (2013.01); *H04L 47/127* (2013.01); *H04W 72/0413* (2013.01); *H04W 72/0486* (2013.01)

(58) Field of Classification Search
CPC ............ H04L 47/127; H04W 72/0413; H04W 72/0486; H04W 72/1252
See application file for complete search history.

(56) References Cited

U.S. PATENT DOCUMENTS

| | | | |
|---|---|---|---|
| 2007/0140165 A1* | 6/2007 | Kim | H04W 72/1268 370/329 |
| 2008/0095055 A1* | 4/2008 | Moulsley | H04L 47/10 370/234 |
| 2010/0008242 A1 | 1/2010 | Schein | |
| 2012/0033569 A1* | 2/2012 | Tesanovic | H04L 43/0817 370/252 |
| 2012/0176984 A1* | 7/2012 | Susitaival | H04W 72/1284 370/329 |
| 2012/0327799 A1* | 12/2012 | Sandlund | H04W 72/1221 370/252 |
| 2013/0100936 A1* | 4/2013 | Pettersson | H04W 72/14 370/336 |
| 2013/0242726 A1* | 9/2013 | Zhu | H04W 28/0268 370/229 |
| 2014/0185467 A1* | 7/2014 | Heo | H04W 52/54 370/252 |
| 2017/0019918 A1* | 1/2017 | Voigt | H04W 72/14 |

FOREIGN PATENT DOCUMENTS

| | | |
|---|---|---|
| WO | WO 2011/025426 A1 | 3/2011 |
| WO | WO 2011/025434 A1 | 3/2011 |

* cited by examiner

*Primary Examiner* — Charles C Jiang
*Assistant Examiner* — Ryan Kavleski (57) ABSTRACT

Method and user equipment for requesting scheduling resources from a serving radio network node, the method comprises obtaining traffic characteristics associated with radio communication between the radio network node and the UE. The method further comprises predicting, based at least on the obtained traffic characteristics, data to arrive in a transmission buffer; and transmitting a scheduling request to the network node before said data arrives in said transmission buffer.

15 Claims, 6 Drawing Sheets

CONTROLLING SCHEDULING REQUESTS

This application claims the benefit of European Application No. 14163208.3, filed Apr. 2, 2014, the disclosure of which is fully incorporated herein by reference.

TECHNICAL FIELD

The present disclosure relates to radio networks. More particularly, the disclosure relates to a method, user equipment and computer program for controlling scheduling requests between a user equipment and a radio network.

BACKGROUND

In the 3rd Generation Partnership Project (3GPP) standardization body technologies like Global System for Mobile Communication (GSM), High-Speed Packet Access (HSPA) and Long Term Evolution (LTE) have been and are currently developed.

Figure 1:
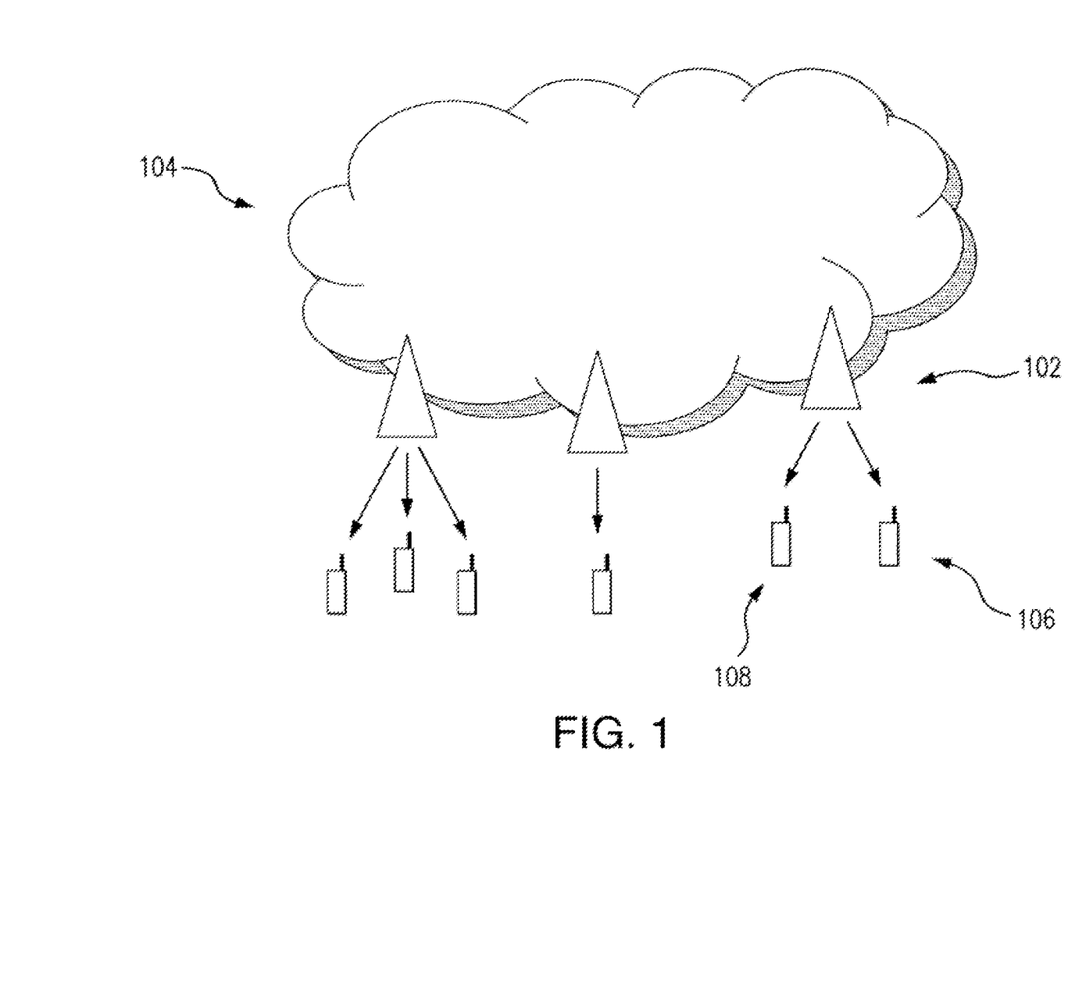
FIG. 1 is an illustration of a radio communication system.

LTE is the latest technology standardised. It uses an access technology based on Orthogonal Frequency Division Multiplexing (OFDM) for the downlink (DL) and Single Carrier FDMA (SC-FDMA) for the uplink (UL). The resource allocation to mobile stations, in LTE denoted user equipment (UE), on both DL and UL is performed adaptively by the concept of fast scheduling, taking into account the instantaneous traffic pattern and radio propagation characteristics of each UE. Assigning resources in both DL and UL is performed in a so-called scheduler situated in a base station, in LTE often denoted eNodeB. As illustrated in FIG. 1, LTE transmissions are sent from base stations 102, in a telecommunications network 104, to UEs 106, 108.

Figure 2:
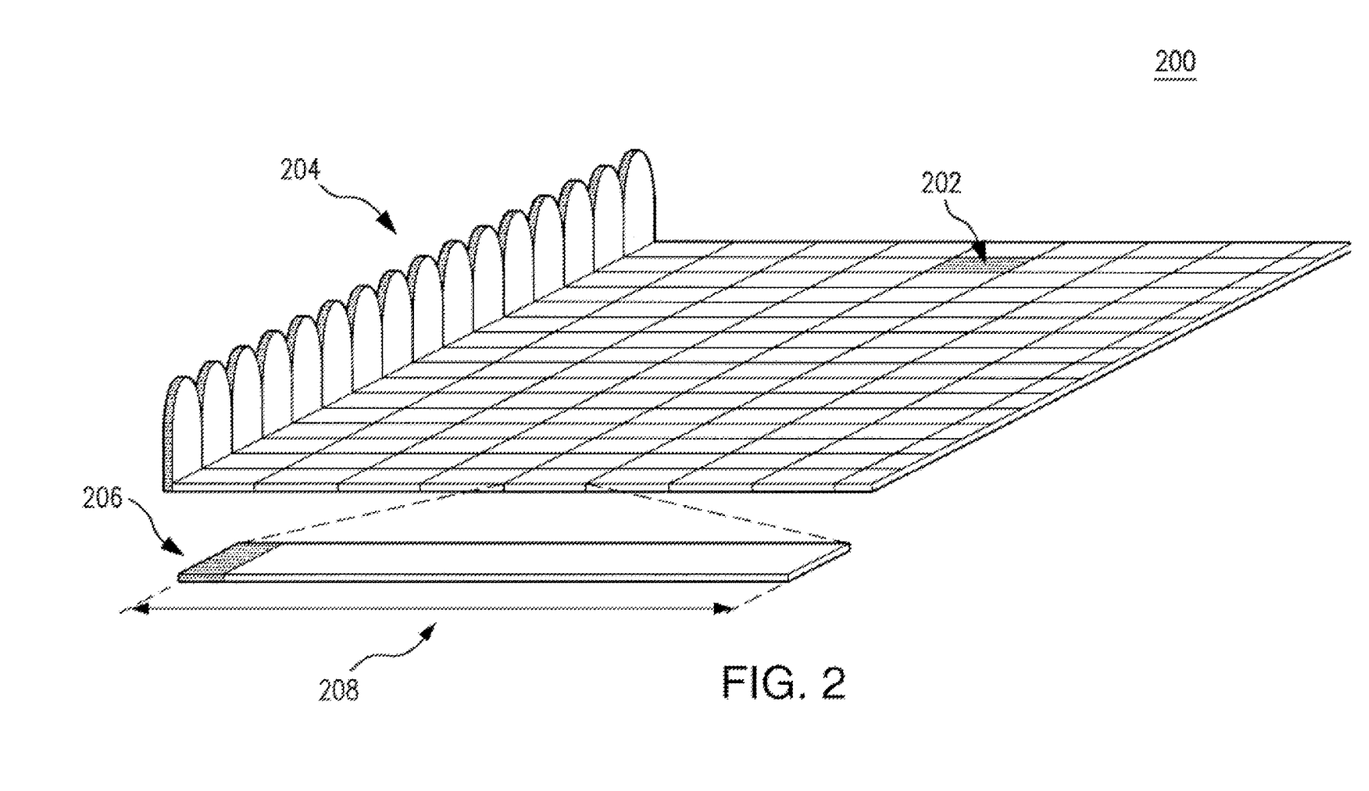
FIG. 2 illustrates an exemplary sub-frame.

As illustrated in FIG. 2, a sub-frame 200 may be transmitted in accordance with the LTE standard, and may consist of 12 or 14 sub-carriers 204 in the frequency domain. In the time domain, the sub-frame may be divided into a number of OFDM (or SC-FDMA) symbols 208. An OFDM (or SC-FDMA) symbol 208 may include a cyclic prefix 206. A unit of one sub-carrier and one symbol is referred to as a resource element (RE) 202. Thus, a sub-frame may consist of, for example, 84 REs in a 12×7 configuration as shown in FIG. 2.

In e.g. LTE, uplink transmissions are scheduled by a base station. A grant is transmitted on the Physical Downlink Control Channel (PDCCH) and the UE responds with a transmission using the resources specified in the grant and with the size specified in the grant. The UE can let the base station know that it wants to transmit by sending a scheduling request (SR) on the Physical Uplink Control Channel (PUCCH) at predefined times. Typically the UE transmits an SR which is followed by one or many grants, each resulting in one uplink transmission. This is commonly referred to as dynamic scheduling.

With the higher speeds a number of various applications that a user of the UE can be engaged in have evolved. It is for instance of interest for a user to involve him- or herself in online games, where small amounts of uplink data are transferred fairly often from the UE to another device involved in a game. Here the transferred data may be gaming commands and the other device may be another UE or another type of user terminal like a PC or even a server. Gaming is one example of delay-sensitive traffic. The increase of this delay-sensitive traffic and its significant share in the Internet traffic leads to the radio interfaces of wireless communication systems having to meet various latency requirements to ensure that a UE user can enjoy the activities employing this type of traffic. Another example of delay-sensitive traffic is ping. Ping is for instance used to estimate the delay of a channel as well as to measure the performance in radio systems in order to for instance compare and/or rank different systems.

Setting up of traffic in a wireless communication network is often referred as allocation of resources. When resources are allocated to a UE desiring to send data in the uplink, there are normally a number of activities that have to be performed. First the UE sends a scheduling request (SR) informing the base station that the UE has an unspecified amount of data to send. This is followed by the base station responding with a grant, which grant includes information on what time/frequency resources the UE shall use. The UE then transfers a Buffer Status Report (BSR) informing the base station that the amount of data the UE intends to send is within a predefined range. The amount of data available is specified for logical channel groups rather than individual bearers. After receiving the BSR the base station issues a grant for further data. It is not until it receives this further grant that the UE can transmit the actual data it intends. This process is time consuming, especially if the UE is to run through the process each time it desires to transfer data.

Instead of dynamic scheduling, semi-persistent scheduling (SPS) can be used. The purpose with SPS is to save resources on the PDCCH when it is known beforehand when data will arrive to the UE. When SPS is used, a semi-persistent scheduling interval is signalled to the UE through the RRC protocol. Special grants (SPS grants/semi-persistent scheduling uplink grants) are then used to configure a recurring grant with the specified interval. One grant can hence be used for multiple transmissions. The semi-persistent grant is valid until it is cancelled by a special grant that explicitly releases the semi-persistent grant. To optimize the power saving with SPS, a mechanism has been added so that no SR is triggered by specified logical channels while an SPS grant is configured.

It is not required that an SR precedes the grant. When the base station knows that a UE has a periodic service or for some other reason can predict future data arrivals it can transmit a grant to the UE without waiting for an SR. It is also possible to blindly transmit grants in order to speed up the scheduling and hence reduce the delay. These scheduling methods are called predictive scheduling and the grants are transmitted from the base station to the UE on the downlink control channel, e.g. PDCCH.

WO2012/148331 discloses a method applying predictive scheduling. Upon receipt of a service indicator from a UE the base station determines an uplink transmission scheme for the UE based on the service indicator. Uplink prescheduling according to the prior art may however result in waste of system resources in case the UE has nothing to send and replies to the prescheduling grants including an empty BSR and padding. Therefore predictive scheduling may lead to a waste of resource and is thus restricted to situations when the traffic load is below certain threshold values so that it will not conflict with regular scheduling in higher traffic load situations.

SUMMARY

It is an object of embodiments described herein to address at least some of the problems and issues outlined above and improve the latency for a user equipment in various traffic load situations. It is possible to achieve this object and others by using a a method in a user equipment, a user equipment, a method in a network node and a network node as defined in the attached independent claims.

According to one aspect a method is performed in a user equipment (UE) for requesting scheduling resources from a serving radio network node. The method comprises obtaining traffic characteristics associated with radio communication between the radio network node and the UE. The method further comprises predicting, based at least on the obtained traffic characteristics, data to arrive in a transmission buffer; and transmitting a scheduling request to the network node before said data arrives in said transmission buffer.

By this method the scheduling request will be sent at an earlier stage compared to a normal scheduling situation where the scheduling request is triggered by data arriving in the transmission buffer. Thereby latency may be saved for the UE irrespective of the traffic load situation.

According to another aspect a user equipment (UE) for requesting scheduling resources from a serving radio network node is provided. The UE comprising an obtaining unit configured to obtain traffic characteristics associated with radio communication between the radio network node and the UE. The UE further comprises a predicting unit configured to predict, based at least on the obtained traffic characteristics, data to arrive in a transmission buffer; and an input/output interface configured to transmit a scheduling request to the network node before said data arrives in said transmission buffer.

According to a further aspect a method in a radio network node for scheduling resources to a user equipment is provided. The method comprises receiving a scheduling request from a user equipment. It is then determined that the scheduling request was predictively sent. The method further comprises setting a priority weight for scheduling resources to the user equipment based at least in part on the determination that the scheduling request was predictively sent, and then allocating scheduling resources to the user equipment based on comparing the set priority weight with priority weight of at least one other user equipment served by the network node.

By this method the network node serving the user equipment uses the knowledge that the user equipment does not have data in the transmission buffer at the time instant when the scheduling request was sent. The network node uses this knowledge in the resource allocation for the user equipments served by the network node.

According to another aspect a network node, for scheduling resources to a user equipment is provided. The network node comprises a receiving unit, i.e. an input interface configured to receive a scheduling request from a user equipment. The network node further comprises a scheduling unit configured to: determine that the scheduling request was predictively sent; set a priority weight for scheduling resources to the user equipment based at least in part on the determination that the scheduling request was predictively sent; and to allocate scheduling resources to the user equipment based on comparing the set priority weight with priority weight of at least one other user equipment served by the network node.

According to yet another aspect computer program comprising code means is provided. When run by a processor the computer program causes a user equipment to: obtain traffic characteristics associated with radio communication between the radio network node and the UE; predict, based at least on the obtained traffic characteristics, data to arrive in a transmission buffer; and transmit a scheduling request to the network node before said data arrives in said transmission buffer.

According to yet another aspect computer program comprising code means is provided. When run by a processor the computer program causes a network node to: receive a scheduling request from a user equipment; determine that the scheduling request was predictively sent; set a priority weight for scheduling resources to the user equipment based at least in part on the determination that the scheduling request was predictively sent; and to allocate scheduling resources to the user equipment based on comparing the set priority weight with priority weight of at least one other user equipment served by the network node.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The solution according to the present disclosure will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present disclosure. However, it will be apparent to those skilled in the art that the solution according to the present disclosure may be practiced in other embodiments that depart from these specific details. In other instances, detailed descriptions of well-known devices, circuits and methods are omitted so as not to obscure the description of the present disclosure with unnecessary detail.

Currently, LTE does not support dedicated data channels; rather, shared channel resources are used in both the downlink and uplink transmissions. These shared resources, Downlink Shared Channel (DL-SCH) and Uplink Shared Channel (UL-SCH), are each controlled by a single scheduler that assigns different parts of the downlink and uplink shared channels to different scheduling entities (e.g., UEs) for reception and transmission, respectively. These schedulers are in full control of in which sub-frame a UE should receive on DL-SCH, or is allowed to transmit on UL-SCH. Scheduling decisions are sent to each UE as downlink assignments and uplink grants. Downlink assignment information and uplink grants may be transmitted as Downlink Control Information (DCI), for instance, using L1/L2 control signaling.

For an uplink (UL) transmission, the portion of the bandwidth assigned to one UE is always a set of contiguous scheduling blocks (SBs) due to the single carrier constraint imposed by the SC-FDMA transmission scheme. These assigned bandwidth resources are indicated in the DCI by a start-SB and an allocation size, which is provided as a number of SBs. LTE currently supports full dynamic scheduling; therefore, the particular bandwidth resource assignment to a UE is only valid for one sub-frame. In the next sub-frame, the same bandwidth resources may be re-assigned, for instance, to another UE.

The UE monitors a set of PDCCHs for uplink scheduling grants. Upon detection of a valid uplink grant, the UE will transmit its UL-SCH according to the information in the grant. The UE may need some time to prepare the data to transmit. Therefore, a grant received in subframe n affects the uplink in a later subframe.

For a Frequency Division Duplex (FDD) system the grant timing is straight forward. An uplink grant received in a downlink subframe n triggers an uplink transmission in an uplink subframe n+4. In a Time Division Duplex (TDD) system the grant timing is a bit more complicated, but yet similar.

An example of a procedure with actions performed by a system of a radio network to request scheduling resources, will now be described with reference to the flow chart in FIG. 3. This procedure thus enables a user equipment to decide that a scheduling request shall be transmitted despite an empty transmission buffer of the user equipment. It is assumed that the system comprises at least a user equipment and a network node, such as a base station, e.g. an eNodeB or similar, that is currently serving the UE with radio access and that a connection has been established with the UE. The system may also comprise a further node communicating with the network node, such as a control node or similar.

A first action 302 illustrates that the UE obtains traffic characteristics that are associated with and somehow pertain to the radio communication between the UE and the network node. Action 302 may be executed more or less at the same time, or even somewhat before e.g. on a continuous basis, as the UE communicates data with the network node serving the UE. At least some of the traffic characteristics may be measured in real-time, e.g. by the system and/or by the UE. Some useful but non-limiting examples of traffic characteristics that may be obtained in this action 302 are presented below. In this context, "data" should be understood broadly to represent any information e.g. related to payload or signaling. This action thus implies a latest activity performed by the UE in terms of communication.

A) One or more services being used by the UE may contribute to the traffic characteristics in that a certain service may require a certain amount or pattern of information to be communicated, e.g. at certain points in time.
B) One or more applications used in the UE may contribute in a similar manner to the traffic characteristics in that a certain application may require a certain amount or pattern of information to be communicated.
C) A radio environment of the radio communication, which may vary more or less significantly e.g. in terms of bandwidth, interference, path loss, coverage, and so forth.
D) A traffic pattern of communicating packets in the radio communication, e.g. depending on time between successive packets, packet size, direction i.e. uplink or downlink, and the number of pending packets in a transmission buffer.
E) Capabilities of the UE, e.g. modulation and coding/decoding abilities, supported number of data streams, support for carrier aggregation and Multiple Input Multiple Output, MIMO.
F) A user behavior in the radio communication, e.g. pertaining to how the user activates and interacts with an application.

However, the traffic characteristics that could be obtained in action 302 are not limited to the above examples A-F.

In a next action 304, a prediction, based at least on the obtained traffic characteristics, of data to arrive in a transmission buffer is performed. This prediction may be made with respect to the next transmission time interval, TTI, or with respect to some other defined time interval, such as 10 or 100 TTIs, or many seconds.

The UE may e.g. predict a waiting time until next data is expected to be communicated with the UE, either in uplink or downlink, based on the obtained traffic characteristics. The network node may thus predict a waiting time right after an activity has been performed and completed by the UE, typically a transmission or reception of data. In some possible embodiments, the network node may predict the waiting time upon a downlink transmission of data to the UE, or upon an uplink scheduling grant to the UE, or upon a transmission of data from the UE. During such a waiting time the likelihood of data arriving in the transmission buffer is predicted to be very low, but after expiry of the predicted waiting time the likelihood will increase, either gradually or in one or more larger steps.

Further, possible embodiments include predicting the arrival of data by entering the obtained traffic characteristics into a prediction model that has been created from traffic statistics collected over time in the radio network. It is thus possible to build a prediction model or algorithm from traffic statistics reflecting various features of the traffic occurring over time in the network. Briefly described, the prediction model can be created basically by: extraction of traffic features in the network and training of the model, which will be described in more detail later below, with reference to FIG. 4.

Further, the prediction may also include a prediction of the time instant when said data will arrive in a transmission buffer of the UE. The above mentioned time instant may be one TTI, or some other defined time interval, such as 10 or 100 TTIs. If the time instant comprises many TTIs, each TTI may be provided with a probability of when the data will arrive.

Figure 3:
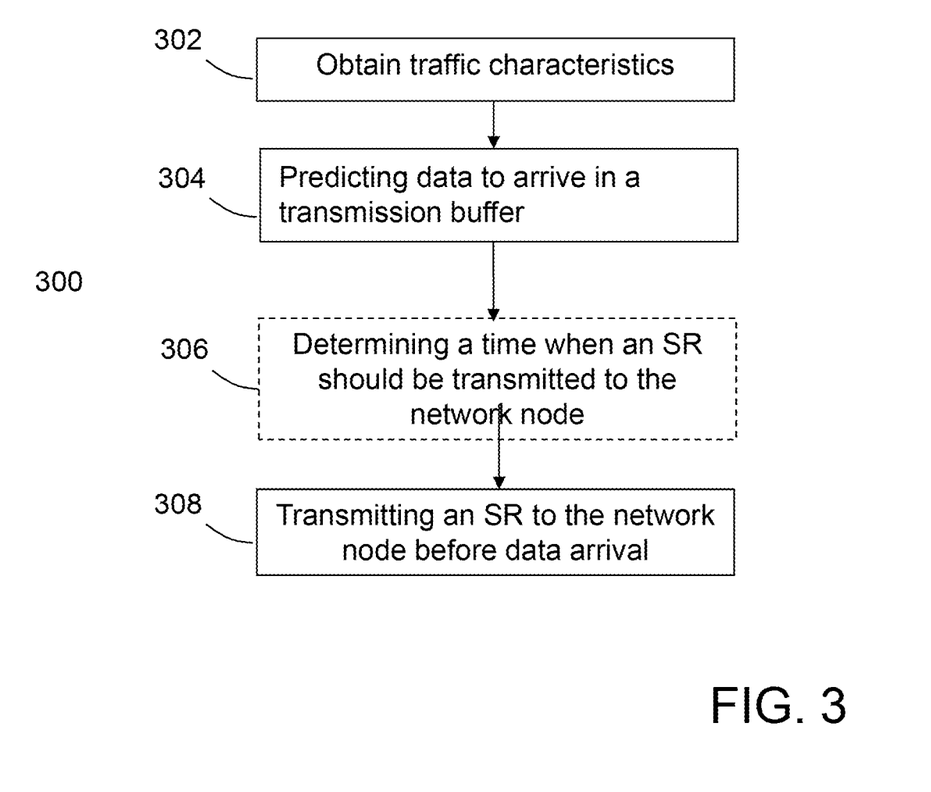
FIG. 3 is a flow chart with actions performed by a user equipment, according to some possible embodiments.

In a next, optional, action 306, see FIG. 3, a time when a scheduling request should be transmitted to the network node is determined. The scheduling request transmission time is determined such that an uplink grant transmitted from the network node in response to the transmitted scheduling request will be received by the UE at a time so that said data will spend as short time as possible in the transmission buffer before being transmitted to the network node.

In LTE, when an uplink packet arrives at an uplink transmission buffer of the UE a scheduling request is triggered. In a system which the scheduling request period is configured as 10 ms, the scheduling request will be sent uniformly distributed between 0 and 10 ms. It will take approximately another 4 ms for the network node to process the scheduling request before an uplink grant can be transmitted to the UE. The average delay for the uplink grant is today approximately 9 ms. According to some embodiments the scheduling request may thus be transmitted 4-14 ms before the predicted data arrival time. If there is knowledge of the time period between initiation of the scheduling request and the receipt of the uplink grant, this period will be used such that the uplink grant is received at the same time instants the predicted data arrival time. If one wants to be sure of not wasting resources, the scheduling request may be transmitted at a time such that the uplink grant is received by the UE one or more TTIs after the predicted data arrival, e.g. in a time window ranging from 1-5 or 3-5 TTIs.

In a following action 308 a scheduling request is transmitted to the network node before the data is predicted to arrive in the UE transmission buffer. If e.g. data is predicted to arrive in a next TTI, the decision to transmit an SR may be made directly and thereby potentially save 1 ms. Of course more sophisticated decisions may be made, e.g. if there is knowledge of the predicted time of arrival of the data in the transmission buffer, the size of the data as well as a likelihood value of the data arriving in the buffer. The prediction may e.g. be that the data will have arrived in the buffer within 15 ms with 50% likelihood and within 20 ms with 75% likelihood. The decision may then be to transmit an SR after e.g. 12 ms, the importance is to transmit the SR before the data arrives in the transmission buffer in order to save latency.

In possible embodiments a UE internal priority weight for transmission of the SR may be applied and vary as function of time. For example, the priority weight may be set to increase as long as the procedure is within a current time window, so that the priority weight is relatively low at the beginning of the time window and increases with time until the end of the time window. Thereby the transmission of scheduling requests may correspondingly increase with the priority weight such that one or more scheduling requests are transmitted in dependence of the priority weight.

In possible embodiments the priority weight may also be based on a predicted size of a burst from the UE. If a burst is expected, e.g. if a predicted likelihood value of data arriving in the transmission buffer is high, information regarding a burst size of the expected burst can be used in order to set a reliable priority weight. If the expected burst size is high, the priority weight will increase and conversely if the expected burst size is low the priority weight will decrease.

By applying the above mentioned method 300, the UE may request scheduling resources without having data in the transmission buffer and consequently the UE will experience less delay since the procedure of requesting resources will be initiated prior to receiving data in the transmission buffer and thus lower the time the data stays in the buffer. I.e. the scheduling request transmissions are triggered by a prediction based on obtained traffic characteristics of data to arrive in a transmission buffer.

According to possible embodiments, since the SRs are triggered by the UE, the network node may not be able to separate the SRs sent without data in the UE transmission buffer from the SRs triggered by data in the UE transmission buffer. The above mentioned procedure may thus be applied independent of the traffic load situation.

According to alternative embodiments a scheduling request may be provided with a flag or similar indication indicating that the scheduling request was sent despite of an empty transmission buffer, i.e. prior to data arriving in the buffer. Thereby the network node may be able to make its own prioritization of the received scheduling request. For example the node may increase or decrease the priority weight for scheduling resources to the UE in comparison with other UEs that are being served by the network node.

According to alternative embodiments a scheduling request may be provided with a time stamp indicating when data is predicted to have arrived in the transmission buffer. Thereby the serving network node may be able to make its own determination of when to send an uplink grant to the UE in order to optimize the use of radio resources.

Figure 4:
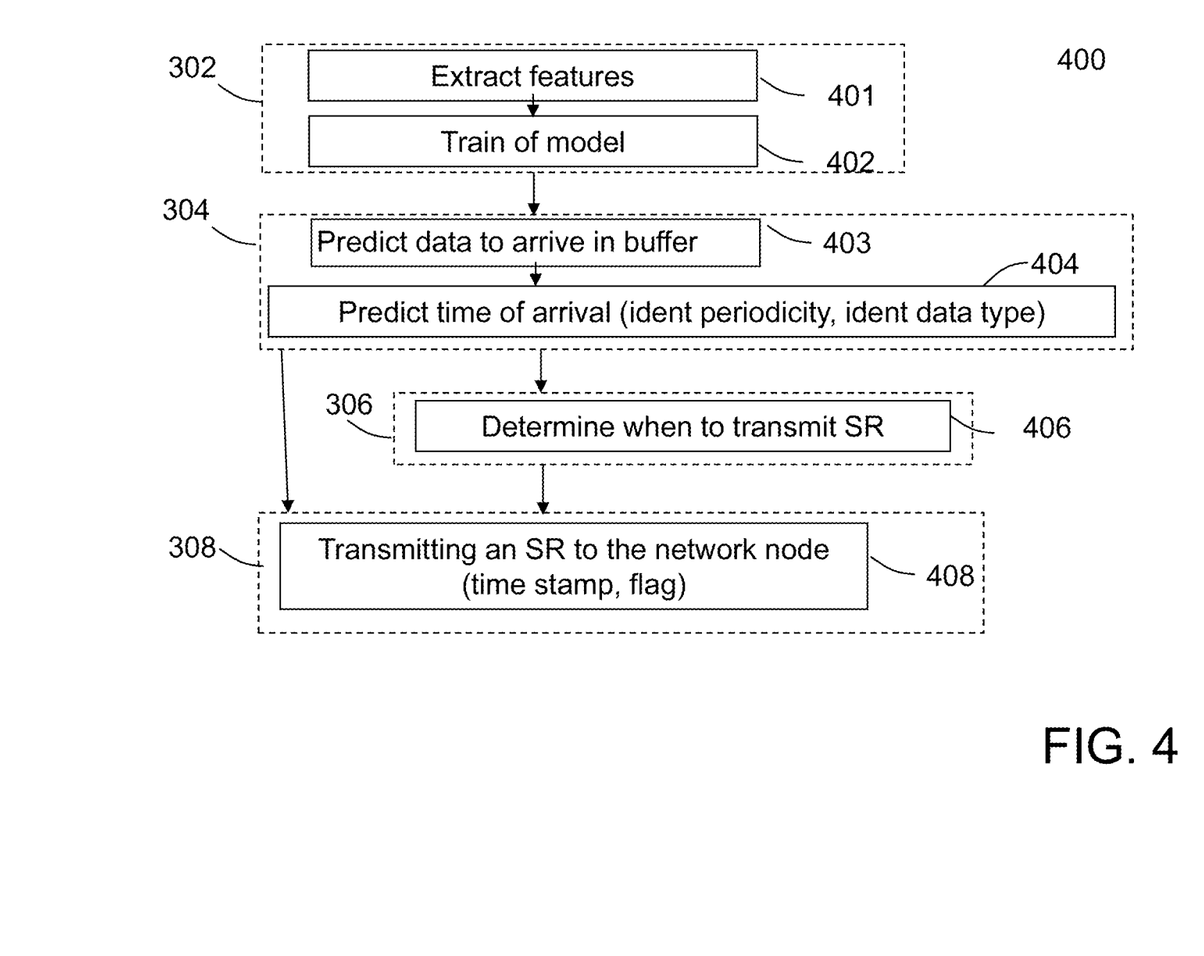
FIG. 4 is a more detailed flow chart with actions performed by a user equipment, according to further possible embodiments.

It will now be described, with reference to the flow chart in FIG. 4, a more detailed example of how the above solution may be applied for predictively scheduling resources for a UE. Note process 400 is illustrated with blocks 401-408, and they are covered by dotted lines of blocks 302-308 to indicate that process 400 is one embodiment of the invention implementing process 300.

It was mentioned above that the prediction of data arrival may be performed by entering the obtained traffic characteristics into a prediction model that has been created from traffic statistics collected over time in the radio network, and that such a prediction model can be created in two stages including extraction of traffic features and training of the model. These two stages may be performed by using existing procedures which are known as such. An example of such a known procedure that may be used when implementing the solution in practice is outlined in more detail below.

Process 400 begins in action 401 by having raw data extracted for each data packet that is communicated, such as a timestamp for packet arrival, size of the packet, whether it is communicated in uplink or downlink etc. This raw data needs to be transformed into a feature vector that can be entered into the prediction model. If a pattern is to be described by this feature vector, it is necessary to use raw data from several data packets, e.g. by using a sliding window for the feature extraction. This sliding window can for example cover the last x number of packets or the last y seconds. Interesting characteristics that describe the pattern of communication in a way that is relevant, are then calculated from the raw data, for example inter arrival times between packets. It may be inter arrival times between uplink packets, between downlink packets, or between uplink and downlink packets. One way of describing these inter arrival times could be to create a histogram vector and use that vector as the feature vector. Another example of defining a feature or characteristics could be to perform a suitable discrete Fourier transform that describes the stream of packets in the frequency domain.

After the features are extracted in action 401, the process continues in action 402 in which pairs of feature vectors and the corresponding inter arrival time is collected. The goal is to train a machine learning model by saying "For feature vector x, I want you to output waiting time y to next packet". This problem is a machine learning problem which lies outside the scope of this disclosure, but several possible algorithms are available. The training may be performed online, that is, as soon as a new feature vector is created and a corresponding waiting time to next packet is determined, the model can be updated. If this is not possible, i.e. due to resource limitations, the information may be saved and training may be performed offline, e.g. during the night.

The initial obtainment of the traffic characteristics may be performed by the UE or by a network node separate from the UE. However, a major advantage of having the UE making the obtainment is that the UE has complete knowledge of which applications or services that are running on the UE. By having traffic characteristics for all applications and services running on the UE, a good prediction of when the UE is to transmit data is fairly easy to make.

After performing actions 401 and 402, describing one possible embodiment of obtaining traffic characteristics (action 302), the process continues with action 403 in which an prediction of data arrival is made, e.g. by predicting a likelihood value of data arrival in a UE transmission buffer. Whenever a new feature vector is obtained, it is entered into the trained machine learning model. The resulting output of the model is a prediction of how the likelihood value of receiving a packet or burst varies over time. This likelihood value may then be used by the logic described in this disclosure to predict that data is to arrive in the transmission buffer.

In a possible next action 404 the time of arrival of data in the transmission buffer is predicted. According to possible embodiments the prediction comprises identifying, from the obtained traffic characteristics, a periodicity of arrival of data in the transmission buffer. This periodicity may then be used in order to determine when to transmit the scheduling request to the network node.

Using the obtained traffic characteristics it is possible to predict when data packets will arrive in the buffer, and make sure that the UE transmits a scheduling request beforehand to match that prediction. As mentioned previously the prediction model is built using historical data collected from the transmission buffer. The most important factor of these measurements is the arrival time for the data packet entering the buffer. A further factor is the data packet size.

When analyzing the UE behavior in a gaming situation, it is observed that uplink data packets arrive in the transmission buffer with an almost fixed interval of 34 ms. With this knowledge, it is possible for the UE to predict when the next data packet will arrive in the buffer and send a scheduling request several milliseconds ahead.

According to possible embodiments the prediction (action 404) comprises identifying, from the obtained traffic characteristics, a certain type of data packets. Many data packets follow a typical Request-Reply type of pattern, meaning that receipt of one such packet in many cases results in the UE generating a new packet to be sent X ms thereafter. Thereby, receipt of such a certain type of data results in subsequent arrival of a second type of data in the transmission buffer. This knowledge and the fact that it is possible to measure the typical, i.e. most likely, value for X, means that a scheduling request can be transmitted from the UE in order to receive a grant in time for sending the second type of data arriving in the transmission buffer. I.e. upon receipt of a first type of data it is possible to determine when to transmit the scheduling request to the network node in order to match the arrival of a second type of data in the transmission buffer.

A possible method for estimating the value for X is by measuring the time it takes for a data packet received by the UE to traverse from the radio layer up to the application layer and back again. Thereby a time of arrival of data in the transmission buffer may be estimated with a very high accuracy. Since the measured time will be different for different types of UE's depending on processing capacity, memory, running processes, etc., it is a clear advantage to initiate predictive scheduling from the UE.

An example of a Request-Reply pattern is the pattern in uplink transmission control protocol acknowledgement, TCP ACK, packets. After initial handshake, typically every second downlink package received by the UE is followed by an uplink ACK packet from the UE to the network node.

In a possible next action 406 a scheduling request transmission time is determined. The SR transmission time is determined such that an uplink grant transmitted from the network node in response to the transmitted SR will match the arrival of uplink data packets in the UE transmission buffer. As also discussed above in combination with action 306, by having knowledge or a good estimate of the time of arrival of data in UE transmission buffer and of the time it takes for an SR transmission to result in a received uplink grant it is possible to make a determination of the SR transmission time in order for the uplink grant to match the arrival of data in the transmission buffer. Depending on the situation, and as also discussed above in combination with action 306, in case of an aggressive SR transmission procedure, the matching may comprise of the SR transmission time being determined such that an uplink grant and the data arrives at the same TTI. If one wants to be surer of not wasting resources, the matching may comprise of the scheduling request being transmitted at a time such that the uplink grant is received by the UE one or more TTIs after the predicted data arrival, e.g. in a time window ranging from 1-5 or 3-5 TTIs.

According to possible embodiments, in the situation where the data arrives in the transmission buffer prior to receiving the requested uplink grant, the arrival of data in the transmission buffer should not trigger the sending of further scheduling requests. In some embodiments a transmittal of a virtual scheduling request, i.e. an SR transmitted despite of an empty (or almost empty) transmission buffer, triggers the start of a timer and before expiry of said timer no further scheduling requests may be transmitted. The timer may e.g. be set to expire after any suitable time period such as 10 ms or 14 ms.

In a following action 408 a scheduling request is transmitted to the network node before the data is predicted to arrive in the UE transmission buffer. Action 408 very much corresponds to action 308 which has already been described above. As indicated in FIG. 4, this action 408 may be performed directly after action 404 or after action 406.

As indicated in the figure and also discussed above, the SR may be provided with a flag or similar indicating that it is a virtual SR.

Further, the SR may be provided with a time stamp a time stamp indicating when data is predicted to have arrived in the transmission buffer. Thereby the serving network node may be able to make its own determination of when to send an uplink grant to the UE in order to optimize the use of radio resources and match the arrival of data in the UE transmission buffer. This means that the UE doesn't have to determine the SR transmission time in order to match the data arrival with the uplink grant receipt. This matching may in this situation be left to the network node to perform.

Figure 5:
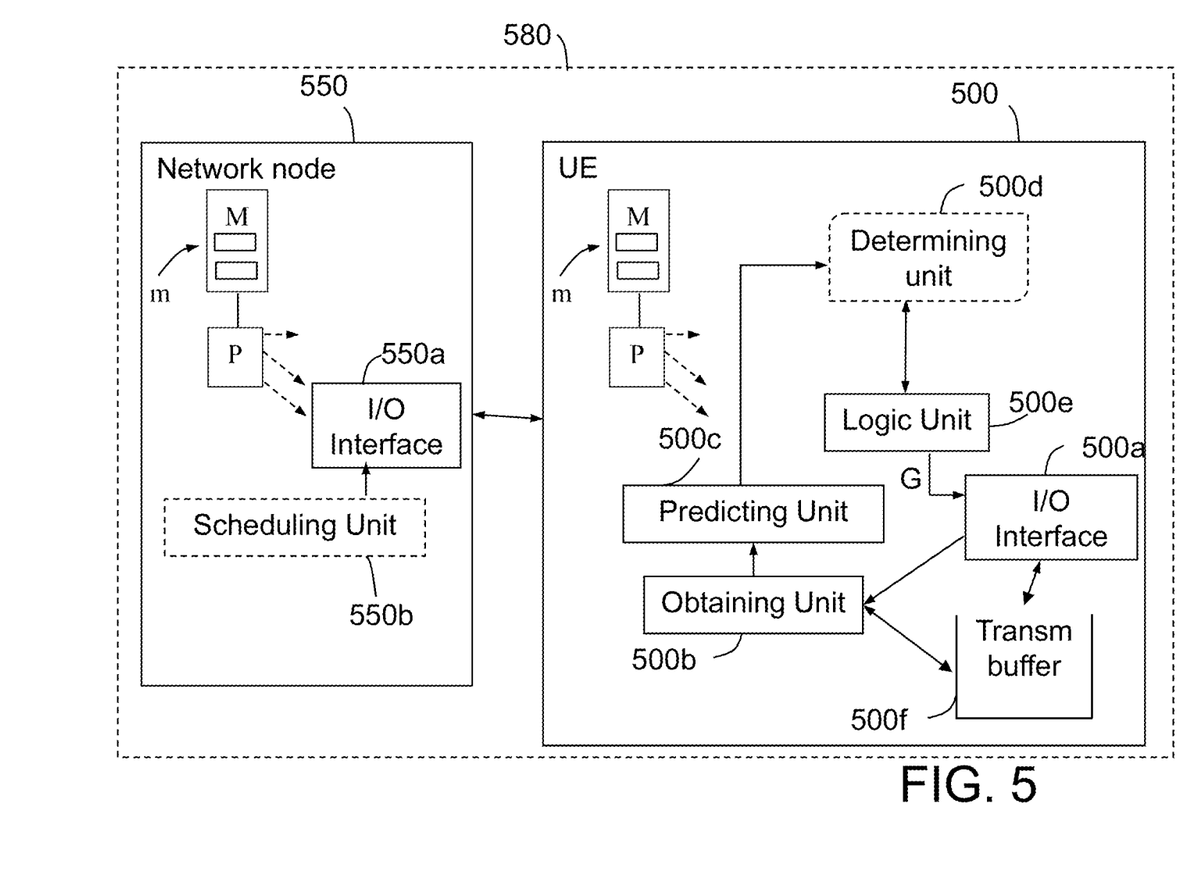
FIG. 5 is a block diagram of a user equipment and a network node in accordance with exemplary embodiments.

A detailed but non-limiting example of how a system 580 comprising a user equipment 500 of a radio network may be structured with some possible functional units to bring about the above-described operation of the network node, is illustrated by the block diagram in FIG. 5. In this figure, a network node 550 is arranged for scheduling resources for a UE 500. The user equipment 500 may be configured to operate according to any of the examples and embodiments of employing the solution as described above and as follows.

The user equipment 500 comprises a suitable input/output interface 500a for conducting radio communication with the network node 550 which may be done in a conventional manner. The input/output interface 500a may also conduct communication with corresponding input/output interface 550a of other network nodes 550 of the network using radio communication or other means of communication.

According to possible embodiments the user equipment 500 also comprises an obtaining unit 500b configured to obtain traffic characteristics associated with the radio communication, e.g. according to any of the embodiments described for action 302 above.

According to possible embodiments the user equipment 500 also comprises a predicting unit 500c configured to predict, based at least on the obtained traffic characteristics, data to arrive in a transmission buffer 500*f*, e.g. according to any of the embodiments described for action 304 above.

The user equipment 500 may also comprise a determining unit 500*d* for determining an SR transmission time, e.g. according to any of the embodiments described for action 306 above.

The user equipment 500 also comprises a logic unit 500*e* configured to, via the input/output interface 500*a*, transmit scheduling requests network node 550 before uplink data has arrived in the transmission buffer 500*f*, e.g. according to any of the embodiments described for action 308 above.

The user equipment 500 also comprises a transmission buffer 500*f*, e.g. a radio link control, RLC, buffer. The transmission buffer 500*f* is a buffer where data packets that are to be transmitted are buffered before they are transmitted on the uplink upon receipt of an uplink transmission grant.

The above user equipment 500 and its functional units may be configured or arranged to operate according to various optional embodiments such as those described above illustrated by FIG. 3 or 4.

The above network node 550 may comprise an scheduling unit 550*b* configured to schedule the sending of uplink grants to the UE in order to optimize the use of radio resources and match the arrival of data in the UE transmission buffer. This requires an SR received from a UE to include a time stamp as discussed with reference to FIGS. 3 and 4.

In case an SR received by the network node 550 includes a flag indicating that the SR is a predictive SR, i.e. an SR sent as a result of predicted arrival of data in the transmission buffer, the scheduling unit 550*b* may use this information when prioritising the transmission of uplink grants to UEs served by the network node.

It should be noted that FIG. 5 illustrates some possible functional units in the system 580 comprising the user equipment 500 and in some embodiments the network node 550 and the skilled person is able to implement these functional units in practice using suitable software and hardware. Thus, the solution is generally not limited to the shown structures of the system 580, and the functional units 500*a-f* and 550*a-b* may be configured to operate according to any of the features described in this disclosure, where appropriate.

The embodiments and features described herein may be implemented in a computer program comprising computer readable code which, when run on a UE, causes the UE to perform the above actions e.g. as described for FIG. 3. The embodiments and features described herein may also be implemented in a computer program comprising computer readable code which, when run on a network node, causes the network node to perform the above actions e.g. as described below for FIG. 6. Further, the above-described embodiments may be implemented in a computer program product comprising a computer readable medium on which a computer program is stored. The computer program product may be a compact disc or other carrier suitable for holding the computer program. The computer program comprises computer readable code which, when run on a radio node, causes the system 580 or user equipment 500 to perform the above actions. Some examples of how the computer program and computer program product can be realized in practice are outlined below.

The functional units 500*a-f* and 550*a-b* described above for FIG. 5 may be implemented in the user equipment 500 and network node 550, respectively, by means of program modules of a respective computer program comprising code means which, when run by a processor "P" causes the user equipment 500 and network node 550, respectively, to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the user equipment 500 and network node 550, respectively, in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the user equipment 500 and network node 550, respectively.

Figure 6:
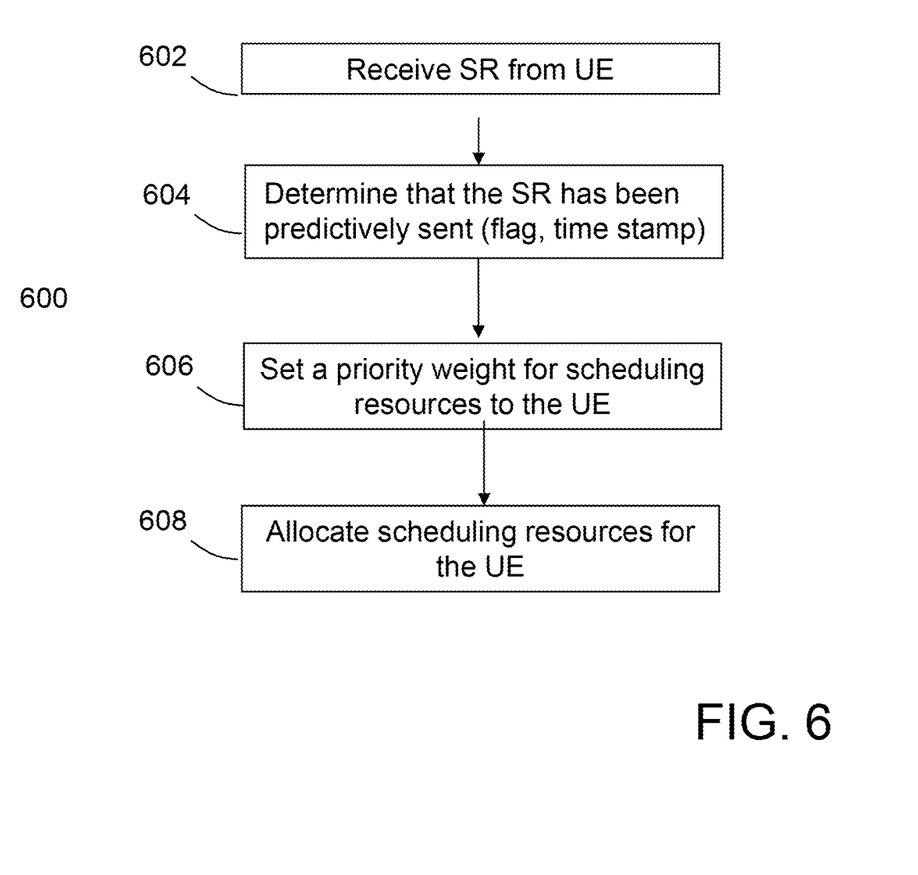
FIG. 6 is a flow chart with actions performed by a network node, according to some possible embodiments.

An example of a procedure with actions performed by a system of a radio network to allocate scheduling resources, will now be described with reference to the flow chart in FIG. 6. This procedure thus enables a network node to decide whether an uplink grant shall be transmitted to a UE despite the scheduling request being transmitted from a UE having an empty transmission buffer. It is assumed that the system comprises at least a user equipment and a network node, such as a base station, e.g. an eNodeB or similar, that is currently serving the UE with radio access and that a connection has been established with the UE.

A first action 602 illustrates that the network node 550 receives a scheduling request from the UE 500. In a next action 604, the network node makes a determination that the scheduling request was transmitted from the UE based on a prediction that data will arrive in the UE transmission buffer. In an example embodiment this determination is made by determining that the received scheduling request comprises a time stamp indicating a predicted time of arrival for when data is to arrive in the UE transmission buffer. The network node may then use this information to schedule the sending of uplink grants to the UE in order to optimize the use of radio resources and match the arrival of data in the UE transmission buffer. In another example embodiment this determination is made by determining that the received scheduling request comprises a set bit, i.e. a flag, indicating that the scheduling request was transmitted as a result of predicted arrival of data in the UE transmission buffer.

In a following action 606, the network node sets a priority weight for scheduling resources to the UE. The knowledge of scheduling request may be used to affect the priority weight, e.g. a network node may set a lower or higher priority for predictively scheduled UL transmission grants. In possible embodiments the priority weight may be based on a predicted size of a burst from the UE, i.e. information regarding a burst size of the predicted burst can be used in order to set a reliable priority weight for the UE. If the expected burst size is high, the priority weight may increase and consequently if the expected burst size is low the priority weight may decrease. Further, the priority weight may in addition be based on the applied Quality of Service, QoS for the UE. Consequently a high QoS classification will increase the priority weight whereas a low QoS classification will increase the same. If the received scheduling request comprises a time stamp the network node may use this time information and temporarily increase the priority weight when any uplink grant transmitted from the network node would arrive approximately to the UE at the same time as transmission data is expected to arrive in the UE transmission buffer.

In a next action 608 scheduling resources using predictive scheduling are allocated for the UE based on comparing the set priority weight with priority weight of at least one other UE served by the network node. The network node may thus compare the priority weights for a number of, preferably all, UEs that are being served by the network node. If the comparison results in the UE getting a sufficient priority weight the network node will allocate scheduling resources to the UE despite the scheduling request being transmitted from a UE having an empty transmission buffer. Consequently, at least one uplink transmission grant is transmitted to the UE in response to the network node receiving a predictively transmitted scheduling request.

Applying the above mentioned procedure the UE may be provided with resources in form of uplink transmission grants independent of the traffic load situation. For example, in some situation depending on the implementation, the priority weight for the UE may increase that of dynamically scheduled UEs (UEs having sent BSRs comprising data already in the transmission buffer to the serving network node) and consequently predictively scheduled UEs may be allocated resources whereas dynamically scheduled UEs may not.

A non-limiting example context of a radio communication network is a cellular network such as a Universal Mobile Telecommunications System (UMTS) network or a Long Term Evolution (LTE) network. These are merely some examples of some types of networks in which the invention may be implemented. Several other types of networks exist.

The invention claimed is:

1. A method in a user equipment (UE) for requesting scheduling resources from a serving radio network node, the method comprising:
    obtaining traffic characteristics associated with radio communication between the radio network node and the UE;
    predicting, based at least on the obtained traffic characteristics, whether data is to arrive in a transmission buffer of the UE; and
    transmitting a scheduling request to the radio network node, said scheduling request requesting an unspecified amount of data and being transmitted responsive to the predicted arrival of said data and before said data arrives in said transmission buffer.

2. The method according to claim 1, further comprising: predicting a time of arrival of said data in the transmission buffer, wherein the scheduling request is transmitted to the network node before said predicted time of arrival.

3. The method according to claim 2, further comprising: determining a scheduling request transmission time for transmitting a scheduling request to the network node in order for an uplink grant transmitted from the network node in response to the transmitted scheduling request to match the arrival of said data in the transmission buffer; and
    transmitting a scheduling request to the network node at said scheduling request transmission time.

4. The method according to claim 1, wherein said predicting comprises identifying a periodicity of arrival of data in the transmission buffer from the obtained traffic characteristics; and using said identified periodicity to determine when to transmit the scheduling request to the network node.

5. The method according to claim 1, wherein said predicting comprising identifying, from the obtained traffic characteristics, a first type of data, wherein receipt of said first type of data results in subsequent arrival of a second type of data in the transmission buffer; and upon receipt of said first type of data, determining when to transmit the scheduling request to the network node.

6. The method according to claim 1, wherein said traffic characteristics are associated with time series prediction of one or more applications or services running on the UE.

7. The method according to claim 1, wherein said scheduling request comprises a flag indicating that the scheduling request was sent despite an empty transmission buffer.

8. The method according to claim 1, wherein said scheduling request comprises a time stamp indicating when data is predicted to have arrived in the transmission buffer.

9. A user equipment (UE) for requesting scheduling resources from a serving radio network node, the UE comprising:
    an obtaining unit configured to obtain traffic characteristics associated with radio communication between the radio network node and the UE;
    a predicting unit configured to predict, based at least on the obtained traffic characteristics, whether data is to arrive in a transmission buffer of the UE; and
    an input/output interface configured to transmit a scheduling request to the network node said scheduling request requesting an unspecified amount of data and being transmitted responsive to the predicted arrival of said data and before said data arrives in said transmission buffer.

10. The UE according to claim 9, the predicting unit of the UE being further configured to predict a time of arrival of said data in the transmission buffer, wherein the UE is configured to transmit the scheduling request to the network node before said predicted time of arrival.

11. A method in a radio network node, for scheduling resources to a user equipment, the method comprising:
    receiving a scheduling request from a user equipment, said scheduling request requesting an unspecified amount of data;
    determining that the scheduling request was predictively sent;
    setting a priority weight for scheduling resources to the user equipment based at least in part on the determination that the scheduling request was predictively sent; and
    allocating scheduling resources to the user equipment based on comparing the set priority weight with priority weight of at least one other user equipment served by the network node.

12. The method according to claim 11, wherein said determination is performed by determining that the received scheduling request comprises a flag indicating that the scheduling request was sent predictively and/or a time stamp indicating when data is predicted to arrive in a transmission buffer of the user equipment.

13. The method according to claim 12, wherein the setting of the priority weight comprises increasing the priority weight at such a time so that an uplink grant transmitted in response to the received scheduling request will arrive in the user equipment at approximately the same time as data is predicted to arrive in a transmission buffer of the user equipment.

14. A Network node, for scheduling resources to a user equipment, the network node comprising:
- a receiving unit configured to receive a scheduling request from a user equipment, said scheduling request requesting an unspecified amount of data;
- a scheduling unit configured to:
  - determine that the scheduling request was predictively sent;
  - set a priority weight for scheduling resources to the user equipment based at least in part on the determination that the scheduling request was predictively sent; and to
- allocate scheduling resources to the user equipment based on comparing the set priority weight with priority weight of at least one other user equipment served by the network node.

15. A non-transitory computer-readable medium comprising code means which, when run by a processor of a user equipment (UE) causes the processor to perform a method comprising:
- obtaining traffic characteristics associated with radio communication between a serving radio network node and the UE;
- predicting, based at least on the obtained traffic characteristics, whether data is to arrive in a transmission buffer; and
- transmitting a scheduling request to the network node, said scheduling request requesting an unspecified amount of data and being transmitted responsive to the predicted arrival of said data and before said data arrives in said transmission buffer.

* * * * *